Feb. 16, 1926.

J. H. GROVE

TRAP

Filed Nov. 10, 1924

J. H. Grove
INVENTOR

BY Victor J. Evans
ATTORNEY

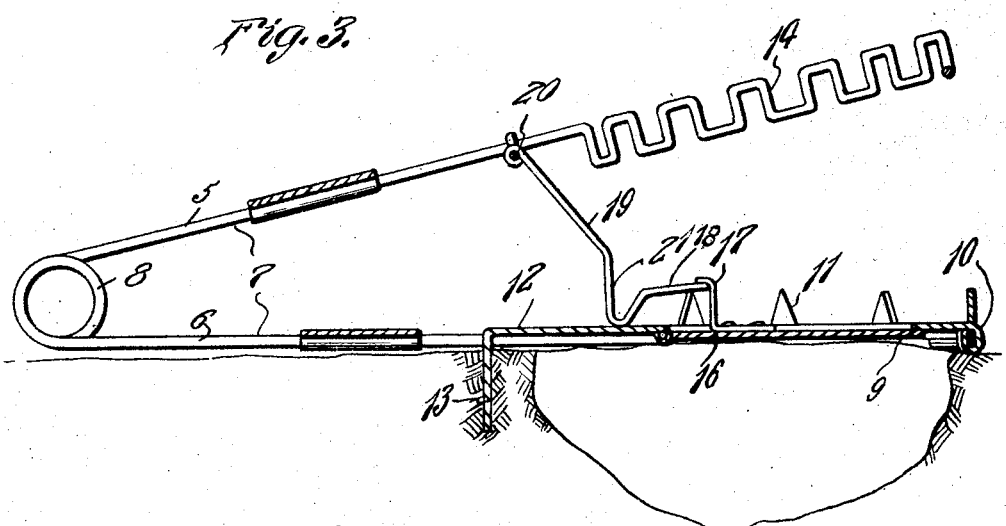
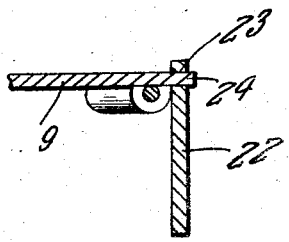
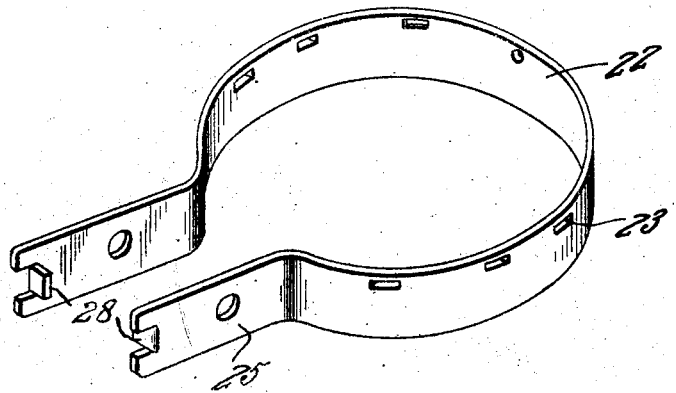
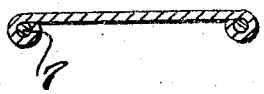

Patented Feb. 16, 1926.

1,573,704

UNITED STATES PATENT OFFICE.

JOHN H. GROVE, OF CASCADE LOCKS, OREGON.

TRAP.

Application filed November 10, 1924. Serial No. 748,979.

*To all whom it may concern:*

Be it known that I, JOHN H. GROVE, a citizen of the United States, residing at Cascade Locks, in the county of Hood River and State of Oregon, have invented new and useful Improvements in Traps, of which the following is a specification.

My invention relates to gopher traps and its primary object is to provide a jaw trap which will eliminate the possibility of the gopher pushing dirt under the trap to prevent the operation of the same.

A further object of the invention is to provide a gopher trap which is adapted to be placed over the gopher burrow or hole in such a manner as to insure catching the rodent as it endeavors to pass into the hole or burrow.

Another object of the invention is to provide a trap of this character which includes a removable base to be used upon a floor or other hard surface to properly support the trap in operative position over the gopher hole.

With the preceding and other objects and advantages in mind, the invention consists in the novel combination of elements, constructions and operations to be hereinafter specifically referred to, claimed and illustrated in the accompanying drawings, wherein:

Figure 3 is a view partly in elevation and partly in section of the device as used in the field.

Figure 4 is a perspective of the detachable base used in conjunction with Figures 1 and 2.

Figure 5 is a fragmentary sectional view of the device.

Figure 6 is a transverse sectional view taken on line 6—6 of Figure 2.

Figure 1:
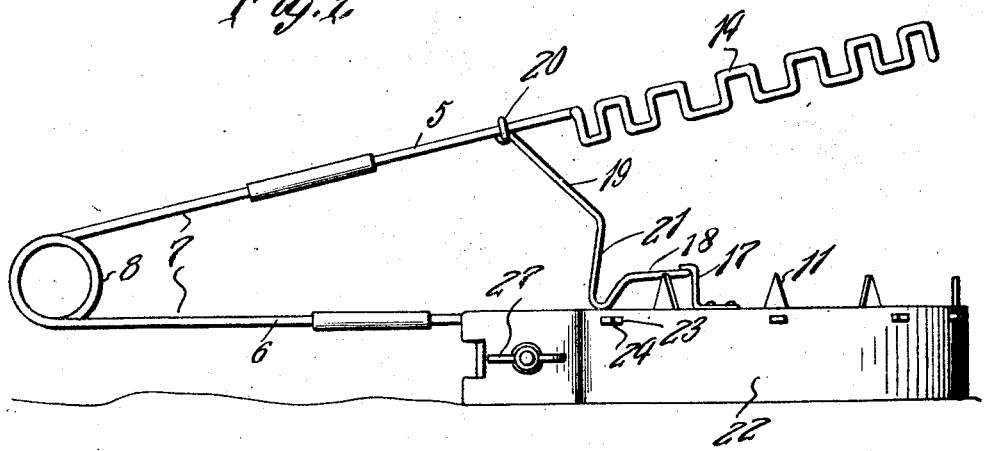
Figure 1 is a side elevation of the invention as used on a floor or other hard surface.
Figure 2:
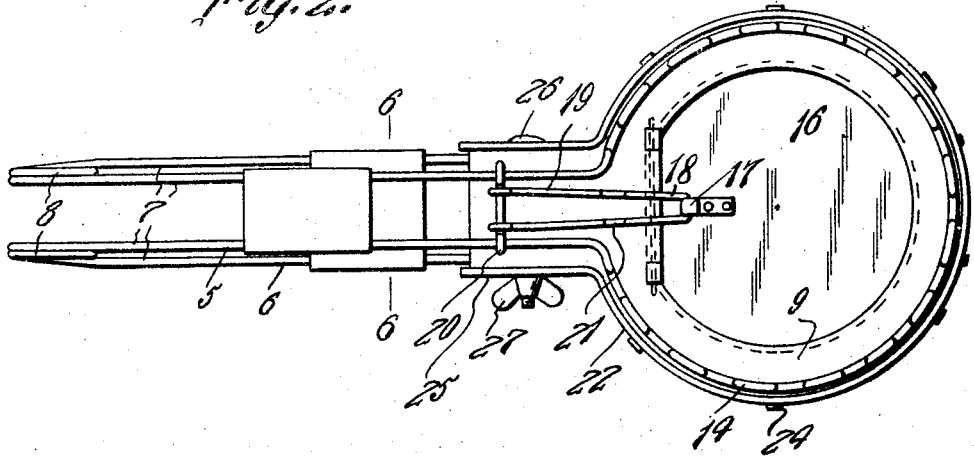
Figure 2 is a top plan view of the same.

Referring to the drawings in detail wherein corresponding characters of reference denote corresponding parts throughout the several views, the numerals 5 and 6 designate a pair of spring jaws. These spring jaws 5 and 6 are fashioned from a single length of wire and includes pairs of longitudinally extending arms 7 connected together by coils 8. A circular plate 9 is provided for the lower jaw 6 and has its edge bent around this jaw as indicated at 10. The edge of this plate 9 is also provided with a plurality of spaced upstanding teeth or serrations 11. The plate 9 is also provided with a rearwardly and longitudinally extending tension 12 having its edges bent around the arms 7 of the jaw 6 and struck from this extension 12 is a downwardly extending anchoring flange 13.

As shown particularly in Figures 1 and 3, the upper circular jaw 5 is corrugated as at 14 and these corrugations coact with the barbs or teeth 11 in impaling the rodent therebetween.

Normally closing an opening 15 in the plate 9 is a pivoted trap door 16 which carries a catch 17 upon its upper face at its pivoted end. For cooperation with the latch element 16 in holding the jaws in such position found in Figures 1 and 3, a trigger 18 is carried by the arms 7 of the jaw 5. This trigger 18 is formed from a single length of wire bent to provide parallel legs 19 having their ends pivotally supported on a transverse member 20 carried by the parallel legs 7 of the jaw 5. The transverse member 20 is slidably arranged on the parallel legs 7 of the jaw 5 so that the trigger 17 may be adjusted longitudinally with respect to the jaw, and consequently hold this jaw in various adjusted positions with respect to the lower jaw. The legs 19 are formed with substantially vertically extending parallel V-shaped teeth 21 adapted to rest upon the extension 12 so that the end of the trigger will engage the catch 17 as illustrated.

With the trap in set position as shown in Figure 3 the gopher upon attempting to enter its burrow will step upon the platform 9 knocking the same downwardly to disengage the catch 17 from the trigger thus allowing the upper jaws 5 to swing into engagement with the lower jaw 6 to clamp the gopher therebetween.

In order to support the trap on a floor surface or the like, I provide an annular base flange 22 having a plurality of spaced slots 23 which receive outstanding lugs 24 graduating from the lower jaw 6. This flange 22 is formed with parallel rearwardly extending arms 25 through which a bolt 26 passes and is provided with a wing nut 27. The free ends of the arms 25 are formed with inwardly extending lugs 28 which overlie the ends of the flange 13. In connection with this base flange it will be observed that in order to detach the same from the base, it is only necessary to first disengage the wing nut 27 and then swing the arms 25 apart sufficiently to disengage the slot 23 from the lugs 24.

While I have shown and described the preferred embodiment of the invention, it is to be understood that changes in the arrangement of parts may be made and that I am only limited by the appended claims.

Having thus described the invention, I claim:

1. A trap comprising a pair of opposed spring urged jaws, a plate carried by the bottom-most jaw, and having an opening therein, a pivoted platform normally closing the opening and adapted to move into an animal burrow, a catch carried by the platform, a pivoted trigger carried by the other jaw and adapted to engage the plate and catch whereby to hold the jaws in open position, the pivotal movement of the platform permitting the jaws to move into gripping relation.

2. A trap comprising a pair of pivoted spring urged jaws, means for normally holding the jaws in set position and adapted to be released by an animal, a plurality of inwardly extending lugs carried by the lower jaw, a base flange surrounding the lower jaw and having a plurality of slots through which the lugs pass, and a bolt engaging the ends of the base flange for holding the latter in position on the jaw.

3. A trap comprising a pair of spring urged jaws, means for normally holding the jaws in set position and adapted to be released by an animal, a plurality of spaced laterally extending lugs carried by the lower jaw, a base flange surrounding the lower jaw and provided with a plurality of spaced slots in its upper edge through which the lugs pass, parallel extensions formed on the base flange and provided with openings, and a fastening passing through the openings whereby to hold the flange in position on the lower jaw.

In testimony whereof I affix my signature.

JOHN H. GROVE.